May 9, 1950 E. H. B. BARTELINK 2,506,766
REMOTE SYNCHRONIZING SYSTEM FOR ROTARY ELEMENTS
Filed Nov. 12, 1948 3 Sheets-Sheet 1

Fig. 1.

INVENTOR.
EVERHARD H. B. BARTELINK,
BY
Ward Crosby Shead
ATTORNEYS.

Patented May 9, 1950

2,506,766

UNITED STATES PATENT OFFICE 2,506,766

REMOTE SYNCHRONIZING SYSTEM FOR ROTARY ELEMENTS

Everhard H. B. Bartelink, Bronxville, N. Y.

Application November 12, 1948, Serial No. 59,721

9 Claims. (Cl. 250—6)

This invention pertains to remote synchronizing systems, and more particularly to a system of this character adapted for synchronizing the rotation of remotely located, motor driven, rotary elements, both as to speed of rotation as well as with respect to angular phase relationships thereof.

An object of the invention is to provide a synchronizing system for accurately controlling the rotation of a distant, motor driven, rotary element, such as a shaft, which may, for instance, carry a radar scanner, by means of data transmission carrier wave circuits, such as radio circuits, which have a transmission pass band in the order of 10,000 cycles per second (C. P. S.). A characteristic of the system is that it transmits a master control frequency signal from a control station to a remote station, where it is used to control the rotation of the shaft or similar device and that it retransmits signals from the remote to the control station, which will permit the control station to check at all times on whether or not the remote or driven rotary element or shaft, is rotating at the identical speed of a similarly driven rotary element or shaft at the control station, and also as to whether or not both shafts are rotating accurately in appropriate phase relationship. In addition, automatic regulating means are provided for restoring a preselected phase relationship between the control station and remote station rotary elements or shafts, if, for any reason, this preselected phase relationship should be disturbed.

The invention may be employed, for example, to provide remote indication on the viewing screen of a radar indicator, of an area searched by a distant radar antenna or scanner. Thus, a radar system of the so called "plan, position indicator" or "PPI" type may be provided at the remote station, comprising radar transmitter and receiver unit together with a scanner, the scanner being mounted in the driven shaft referred to. At the control station a PPI radar indicator is installed, the deflection coil of which is mounted in the driven shaft thereat. The triggering pulse and video or echo signal or "pips" picked up by the radar antenna and receiver at the remote station are transmitted to the control station, for example, by radio, and applied to the radar indicator thereat, thus, to produce on the cathode ray tube screen thereof an image of the area searched by the radar antenna at the remote station.

The remote synchronizing system of the invention embodies the following principles of construction and operation: A master frequency, $f_0$, is generated at a transmitting or control station. This frequency may be, for example, 4000 C. P. S. The master frequency $f_0$ is applied to an electronic frequency divider which divides it in the ratio of $n:1$, to provide a lower output frequency, $f_0/n$. The resulting output frequency $f_0/n$, which may, for example, be 250 cycles per second (C. P. S.), is used to drive a self-starting synchronous motor, the rotor of which is rigidly attached or keyed to what I refer to herein as the "fast shaft." If desired, a booster motor may be used to supply a major part of the required torque for driving this shaft, in which case, the synchronous motor serves only to provide the additional torque necessary to obtain synchronous speed. In any event, the synchronous motor drives the "fast" or "master" shaft referred to, which latter may drive the deflection coil of a radar indicator of the so called "plan, position indicator" or PPI type, through a differential gear and a reduction gear. The reduction gearing provides a gear reduction ratio of $m:1$. Assuming that the synchronous motor is of the four pole type, the master shaft will operate, under the conditions above assumed, at 3750 revolutions per minute (R. P. M.) or 62.5 revolutions per second (R. P. S.) If the reduction gearing is in the ratio of 60:1, the radar shaft, referred to herein as the "slow shaft" will revolve at approximately one revolution per second. Through equipment which permits of the insertion of additional intelligence channels, as described hereinafter, the master frequency, $f_0$, is also applied to a carrier wave transmitter at the control station, which may for example be a frequency modulated radio transmitter, operating in the very high frequency or so called "V. H. F." band, and having a band pass characteristic of approximately 10 kilocycles. Other radio transmission systems insuring a "constant gain circuit" and other frequencies, such as microwaves may be used.

At the distant or remote station, a corresponding carrier wave receiver is installed, the output of which is connected to suitable filter networks, for isolating the additional intelligence channels inserted at the transmitter. Through this takeoff system, the output of the carrier wave receiver is connetced to a filter which is sharply tuned to separate the master control frequency $f_0$. The output of this filter, $f_0$, is employed to synchronize a remote oscillator, such for example as a multivibrator, having a 'free running" frequency nearly equal to that of the master oscillator. This multivibrator serves two functions:

It performs a "limiting" operation on the incoming signals of frequency $f_0$, so that the multivibrator output, which drives the other circuits of the remote station, as discussed below, has an output intensity level which is independent of the signal intensity input to the multivibrator, within wide limits. The multivibrator also maintains on hand a frequency supply which is very nearly equal to that of the master frequency, to continue driving the system over any such periods during which the transmission of the master frequency might be interrupted.

The multivibrator output is applied to another frequency divider at the remote station having a ratio of $n:1$, and this in turn drives a synchronous, self-starting motor, similar to the one employed at the control station. The rotor element of this synchronous motor, is, like that at the control station, rigidly attached or keyed to a "fast shaft," which through another gear reduction, having a ratio of $m:1$, drives a "slow shaft" which may carry for example a radar antenna or "scanner" and also the indicator deflection coil of an associated radar transmitter and receiver. Also, and as at the control station, a booster motor may be provided to supply auxiliary torque to drive the fast shaft at the remote station.

The multivibrator output at the remote station, which normally has the same fundamental frequency, as that of the master oscillator, is applied to a carrier wave transmitter at the remote station, through a filter system, a switching system and through suitable networks to insert additional intelligence channels.

The motor shaft at the remote station carries a serrated wheel, of magnetic and magnetized material, which induces a frequency in an associated induction coil, which frequency is four times higher than the shaft rotation for a four pole synchronous motor, six times that for a six pole motor, etc. If this motor is operating synchronously, the output of this coil will have a frquency equal to $f_0 n$. This output frequency is applied to the carrier wave transmitter at the remote station, and thus transmitted to the carrier wave receiver at the control station. At the control station, a carrier wave receiver is provided, which, through proper takeoff circuits for the additional intelligence channel, feeds an alarm and test circuit. A similar toothed wheel and pickup coil is provided in the motor shaft at the control station and its output is also applied to the alarm and test circuit referred to for comparing the speed of rotation of the motor shaft at the remote and control stations respectively and operates an alarm if frequency deviation occurs. The toothed wheel pickup coil at the control station is also connected to a second alarm and test circuit to which the output of the frequency divider thereat is connected for indicating non-synchronous operation of the motor shaft at the control station as compared to the frequency $f_0/n$ derived from the master oscillator.

Reverting to the remote station, the multivibrator frequency output, is filtered, and through switching facilities applied to the intelligence insertion network. In the latter it may be either mixed with other intelligence or used as a subcarrier to generate "carrier channels" as described hereinafter. In either case, part of the frequency $f_0$, from the mutivibrator output, is passed on to the carrier wave transmitter at the remote station, and thus transmitted therefrom to the control station. At the control station, this frequency is filtered out and applied to a further test and alarm circuit, to which the output of the master oscillator is also applied, thereby to indicate any frequency deviation as between the output of the multivibrator at the remote station, and the output of the master oscillator at the control station.

It is thus seen that, with the synchronizing system of the invention, the master frequency $f_0$ is transmitted from the control station to the distant station, is employed there to synchronize the remote oscillator or multivibrator thereat, an output component of which latter is returned to the control station, where it is constantly compared with the output of the master oscillator, so that a continuous supervision as to synchronous operation exists at all times at a high frequency level. It is also seen that an additional low frequency comparison is continuously provided by virtue of the toothed wheel and pickup coil assemblies, to insure that the speeds of rotation of both motor shafts at the control and remote stations respectively, are identical.

The circuit arrangements above discussed, assure that both motor shafts are operating at the same speed or frequency of rotation. The problem of phasing will now be considered. At this point it should be noted that for simplicity and easier understanding, mechanical switching devices are shown in the annexed drawings, as discussed below. It is to be understood however, that electronic or electromechanical switching devices may be substituted for these switching functions.

The slow shaft, i. e., the one operating at slow speed at the remote station, and which drives the PPI scanner, is equipped with a cam operated switchover contact. This cam is so designed that it will operate the switch contacts for a period corresponding to less than a full revolution of the motor or "fast shaft." Another cam is provided on the motor or fast shaft, which likewise operates a switchover contact. These switchover contacts are so wired, as explained below, that the combination of these contacts will continue to supply the multivibrator output of frequency $f_0$, to the remote transmitter, except for such part of a revolution of a fast and slow shaft, during which the high speed cam operates the high speed switchover contact, while, at the same instant, the low speed switchover contact is operated by the low speed cam. During this period the multivibrator output can either be completely cut off, or greatly attenuated in value, while, at the same time, either one single additional frequency, $f_1$ or $f_2$, may be applied to the transmitter, or alternatively a combination of these two frequencies, $f_1$ plus $f_2$, may be impressed upon the transmitter. The resulting transmission of either the interruption or "notch" of the frequency $f_0$, or of the special frequencies referred to, marks the indexing point on the remote slow or scanner shaft. For the values assumed above, one revolution of the fast drive shaft corresponds to about 16,000 microseconds, and to about 6° of arc on the slow drive shaft. Assuming a 15° closure time on the high speed shaft switch contacts, this corresponds to about 650 microseconds or about ¼° of rotation on the slow or scanner shaft. As this corresponds approximately to 2½ cycles on a 4 kilocycle tone, or 6½ cycles on a 10 kilocycle tone, and as the frequencies $f_1$ and $f_2$ above referred to may be in the order of 10 kilocycles, it is seen that proper keying of such tones can be obtained in this manner.

At the control station, a filter and detector system if provided, which is tuned to the frequency $f_0$ if "notching" of the master frequency is employed for indexing, and is tuned to the frequency $f_1$ or $f_2$ if a single "marking" frequency is used. If two marking frequencies are employed, or if marking frequencies are combined with notching (partial or complete) of the distant master frequency, then a filter system is installed at the control station for each of these frequencies, and their outputs are combined through an interlocking circuit which will generate an output only when the desired combination of frequencies or notching is received. At the remote station, the additional intelligence channels may be interrupted for the duration of the indexing pulse.

At the control station, early and late gate impulses are generated by a combination of contact segments, mounted on the fast and slow shafts thereat respectively, in a manner similar to those above described for the remote station. The early and late gate impulses and the indexing pulse are applied to a phasing circuit which drives a phasing motor. The latter, through a second differential, drives the differential inserted, as above referred to, between the synchronous motor and the slowly driven shaft at the control station. As a result of this arrangement the phasing circuit and motor automatically maintain the fast and slow shafts at the control station in phase synchronism with those at the remote station. The function of the second differential above referred to is to permit the manual adjustment of this phase relationship, by means of the hand wheel attached to one of its shafts.

For transmitting the triggering pulses and video signals of the radar system at the remote station to the radar indicator at the control station, a separate radio system from that above discussed, is preferably employed comprising an additional radio transmitter at the remote station and a corresponding additional radio receiver at the control station.

In connection with the above it is pointed out that it is not important whether one radar shaft picks up or drops a complete revolution with respect to the other during the starting up period, since this merely results in missing a scan. The important factor is that the remote and control station shafts be maintained in precise phase relationship, and the present invention provides automatic adjusting means to assure this.

The synchronizing system of the invention is accordingly characterized by the following features: Synchronous operation by means of a master frequency, transmitted from the control station and received at the remote station to synchronize the remote oscillator thereat, an output component of which is retransmitted to the control station, continuously compared thereat with the master frequency. An additional feature resides in the generation of an additional and lower frequency, at the control and remote stations which frequency is applied to synchronous motors each driving a shaft, while at the remote station, an additional frequency is generated which is indicative of the speed of rotation of the remote synchronous motor, and which is transmitted to the control station, and continuously compared thereat with a frequency similarly derived from the synchronous motor shaft at the control station. Also this latter frequency is continuously compared with the frequency $f_0/n$ derived through the frequency divider from the master oscillator at the control station. Further characteristics are the generation of an indexing impulse at the remote station, for indexing the position of the slowly driven shaft thereat, transmission of this pulse to the control station, and utilization thereof at the control station for deriving a visual indication of the relative lineups or angular phase relationships of the slowly driven shafts at the control and remote stations respectively; as well as the provision of automatic phase control, which advances or retards the slowly driven shaft at the control station, so as to maintain it in phase with the slowly driven shaft at the remote station.

Having thus described the invention in general terms, reference will now be had, for a more detailed description thereof, to the accompanying drawings wherein:

Figure 2 is a view of the invention generally similar to Figure 1, but illustrating diagrammatically one arrangement, in accordance with the invention, for superimposing the intelligence channels on the synchronizing system; while Figure 3 is a further view generally like Figs. 1 and 2, but illustrating a modified arrangement superimposing the intelligence channels on the synchronizing system.

Figure 1:
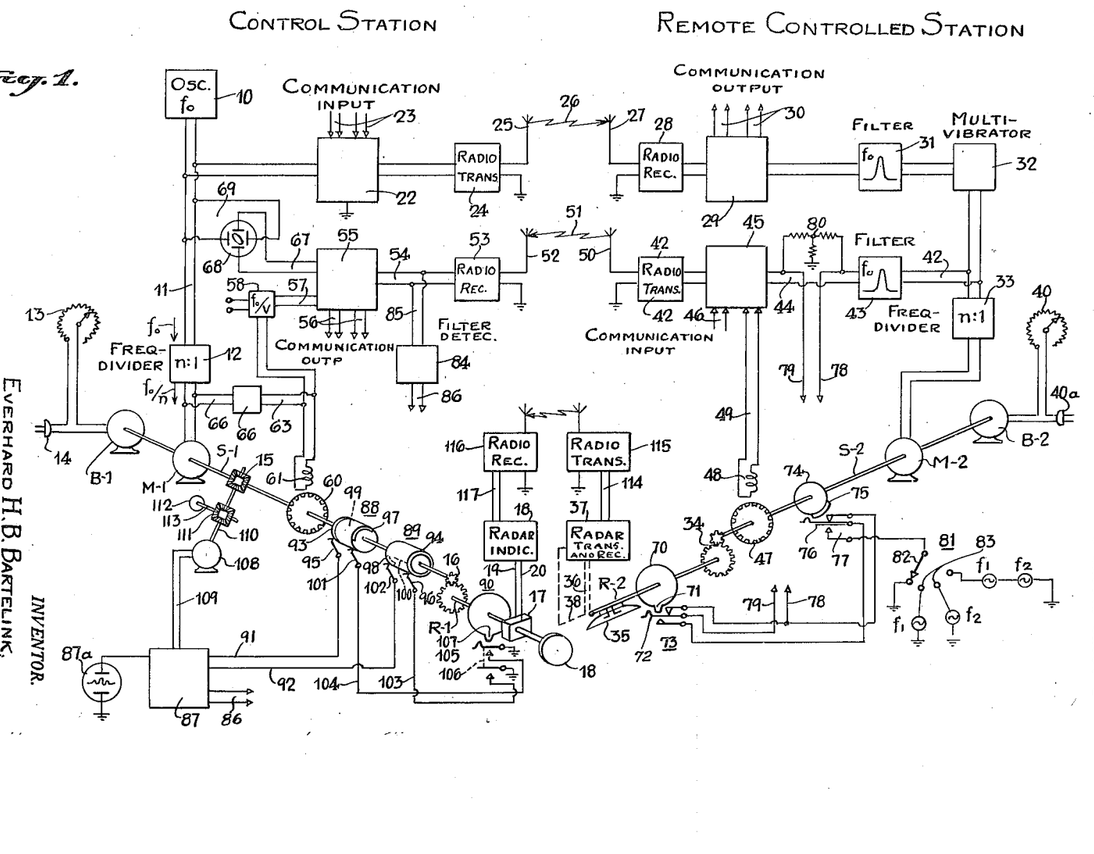
Figure 1 is a diagrammatic layout of a preferred embodiment of the remote synchronizing system in accordance with the invention, employing the various features above discussed, in which drawing, however, the details of the intelligence channels referred to are omitted.

Referring to Figure 1, a master frequency $f_0$ is generated by a master oscillator 10 at the "control station" shown and so designated at the left in the figure. This frequency $f_0$ may, for example, be 4000 cycles per second. The master frequency $f_0$ is applied over connections 11 to an electronic frequency divider 12 which divides the frequency in the ratio of $n:1$, resulting in an output frequency of $f_0/n$ for an input frequency of $f_0$, as indicated by the arrows so designated in the drawing. The resulting output frequency $f_0/n$ which may, for example, be 250 C. P. S., is used to drive a self-starting synchronous motor M—1, such for example as a split-phase motor, the rotor of which is keyed to and drives a master shaft S—1. If desired a booster motor B—1, the rotor of which is likewise keyed to shaft S—1, may be employed to supply a major part of the driving torque applied to shaft S—1, in which case motor M—1 provides only the additional torques necessary to attain and maintain synchronous speed. To this end the booster motor may be provided with a speed control, such as a rheostat 13, for adjusting the drive of shaft S—1 by the booster motor, close to synchronous speed. Motor B—1 may be driven from an independent source of power supply by inserting plug 14 in a power supply socket. The so driven master shaft S—1 may in turn be employed to drive through a differential gear 15 and a reduction gear chain 16, a shaft R—1. Shaft R—1 may, for example, comprise the shaft carrying the deflection coil 17 of the cathode ray tube scope 18 of a radar indicator 18, the triggering and video connections from which to the scope are indicated at 19 and 20.

For such purposes the gearing 16 provides a gear reduction in the ratio of $m:1$. Assuming that master shaft S—1 is driven by a four pole motor, its rotor will operate at 3750 revolutions per minute (R. P. M.) or 62.5 revolutions per second (R. P. S.) under the conditions assumed above. If the gear reduction of gearing 16 is in the ratio of 60:1, the PPI deflection coil 17 will revolve at approximately one revolution per second to effect a 360° scan.

Through equipment indicated by rectangle 22 and described below, which permits of the insertion of additional communication or intelligence channels, 23, the output frequency $f_0$ of the master control oscillator 10, is applied to a carrier transmitter 24, shown for illustrative purposes only, as a radio transmitter, connected to an antenna 25, which may be a frequency modulated transmitter operating in the very high frequency or "V. H. F." band of 30 to 300 megacycles and having a band pass of approximately 10 kilocycles (kc.), or which may be a radio transmission system using FM or other modulation systems which insure constant gain transmission in other frequency bands for instance in the microwave band.

At the distant or "remote controlled station" shown at the right and so designated in the drawing, the radio signals 26, emanating transmitter 24 and antenna 25, are picked up by an antenna 27, connected to a radio receiver 28, adapted to receive the same. The demodulated output of receiver 28 including the transmitted master frequency $f_0$, is applied to equipment indicated by rectangle 29, described below, for taking off as at 30, the additional communication or intelligence channels inserted at 23 of the control station. Through this take-off equipment 29, the output of receiver 28 is applied to a filter 31, which is sharply tuned to accept the master control frequency, $f_0$. The frequency $f_0$ passing through filter 31, synchronizes a multivibrator 32 having a free running frequency nearly equal to that of the master oscillator frequency $f_0$. The multivibrator 32 performs two functions. It maintains a substantially constant output, of the frequency $f_0$ throughout a wide range of variation in intensity of this frequency impressed on the multivibrator input from the filter 31. The multivibrator also maintains on supply, a frequency which is very nearly equal to the master frequency $f_0$ during such intervals as the incoming master frequency may be interrupted, so that it will drive the fast shaft in the remote station at very nearly the correct speed during such periods.

The output of multivibrator 32 is applied to a frequency divider 33 which divides the frequency in the ratio of $n:1$. The output of the frequency divider is applied to a self starting synchronous motor M—2, similar to M—1 at the control station. Motor M—2 drives a shaft S—2, which in turn drives through reduction gears 34, having a gear ratio of $m:1$, a shaft R—2 which carries a radar antenna or scanner 35, connected over connections indicated schematically by the dotted line 36 to a PPI radar transmitter and receiver 37, the deflection coil of the indicator of which is mounted on shaft R—2 or driven by it as indicated by the dotted lines 38, in the same manner as illustrated at 17, 18, for the control station indicator 18.

If desired the drive applied to shaft S—2 by the synchronous motor M—2, may be supplemented by a booster motor B—2 provided with a speed control 40, and a socket power plug 40a, in the same manner as was above described for the corresponding arrangement employed at the control station.

The output of multivibrator 32, which is normally of the same fundamental frequency $f_0$ as that of the master oscillator 10, is also applied over connections 41 to a transmitter 42 at the controlled station, through a filter 43, a switching system, shown generally at 44, and through suitable network apparatus indicated by the rectangle 45, and described below, for inserting additional communication and intelligence channels as at 46.

The motor shaft S—2 at the remote station, carries a serrated or toothed wheel 47, of magnetic and magnetized material, which induces a frequency in an associated induction coil 48, which frequency is four times that of the periodicity of shaft rotation, i. e., of shaft S—2, for a four pole synchronous motor, such as M—2, six times that for a six pole motor, etc. If motor M—2 is operating synchronously with motor M—1 at the control station, the output of coil 48 will be equal to the frequency $f_0/n$. This output is applied over conductors 49 to the radio transmitter 42 at the remote station, through the network 45. At the remote station the transmitter 42 is provided with an antenna 50 for transmitting signals 51 to a receiving antenna 52 of a radio receiver 53 at the control station.

Referring to the control station, the demodulated output of receiver 53 is applied over connections 54 to appropriate networks as described below for taking off the intelligence or communication channels, as at 56, and also for separating into channels the frequencies $f_0$ and $f_0/n$ incoming from the remote station. The frequency $f_0/n$ is applied over connections 57 to an alarm and test circuit 58. At the control station shaft S—1 is provided with a toothed wheel 60 and associated pick-up coil 61, similar to 47, 48 at the remote station, the output from coil 61 being applied over connections 62 to the alarm and test circuit 58, and being also applied over connections 63 to a similar alarm and test circuit 64. To this latter test circuit 64 there is also applied over connections 66, the frequency $f_0/n$ derived through the frequency divider 12 from the master oscillator 10. Thus the alarm and test circuit 58 continuously compares the speed of rotation of shafts S—1 and S—2 at the control and remote stations respectively by virtue of the low frequency outputs from the toothed wheel pickup coils 61, 48 applied to the alarm circuit. At the same time the alarm and test circuit 64 continuously compares the low frequency output from pickup coil 61 with the frequency $f_0/n$ derived from the master oscillator 10. If shaft S—1 at the control station is not operating synchronously, to generate in coil 61 the frequency $f_0/n$, the alarm circuit 64 will so indicate; while if shafts S—1 and S—2 at the control and remote stations are not operating synchronously, the alarm circuit 58 will so indicate.

Returning to the remote station, a part of the frequency output, $f_0$, of the multivibrator 32, is, as above explained, fed through filter 43 and applied over connections 44 as described below, to the intelligence input network 45. In the latter the multivibrator frequency may be either mixed with other intelligence, or used as a subcarrier to generate "carrier channels." In either case part of the frequency, $f_0$, from the multivibrator is passed on to the remote station transmitter 42, and transmitted thence to the control station receiver 53, from whence a portion is passed through the intelligence output network 55, being filtered out therein and fed thence over connections 67 to an alarm and test circuit 68, to which the output frequency $f_0$ of the master oscillator 10 is also connected over leads 69. In this way the alarm and test circuit $66a$ indicates any frequency deviation between the output of the multivibrator 32 at the remote station and that of the master oscillator 10 at the control station.

As illustrated at $66a$, the alarm and test circuit like those at 58, 64, may take the form of a cathode ray tube having pairs of vertically disposed deflector plates of which the circuits to be compared are respectively connected in the manner illustrated by connections 67, 69. Thus if the frequency input over these two connections are the same, a stationary ellipse will be produced on the screen as indicated, but if the frequency inputs differ the ellipse will rotate or wobble about its axis in well known fashion visually to so indicate. These test circuits may also incorporate relays actuating audible alarms if desired, also in a manner well known and hence requiring no detailed description.

It is thus seen that in the operation of the system, the output frequency $f_0$ of the master oscillator 10 is transmitted from the control station to the remote station, is utilized there to control the multivibrator and appurtenant apparatus, and is returned as the multivibrator output to the control station, where it is constantly compared with the original, master frequency of oscillator 10, so that a continuous supervision as to synchronous operation at the remote station exists at high frequency, namely, at frequency $f_0$. It is also seen from the above that an additional low frequency comparison, at frequency $f_0/n$, is continuously made in order to assure that the speeds of rotation of both motor shafts S—1 and S—2 at the control and remote stations, respectively, are identical, the same applying also to the radar shafts R—1 and R—2 at the two stations respectively.

The apparatus as thus far described assures that radar shafts R—1 and R—2, at the control and remote stations respectively, will operate at the same speed or frequency. The apparatus for maintaining these shafts in the same phase relation, or in phase synchronism will now be considered. At the remote station, shaft R—2 which operates at slow speed, has mounted thereon a cam wheel 70, provided with a cam segment 71, which actuates a switch arm 72, of a switch 73, between back and front contacts thereof. The cam segment 71 is so designed that it will operate switch arm 72 from its back to its front contact for a period less than that required for a full revolution of the fast revolving motor shaft S—2. Another cam 74 is mounted on the fast motor shaft S—2, this cam having thereon a cam segment 75, which actuates a switch arm 76 of a switch 77, between back and front contacts thereof. The above mentioned connections 44, which transmit the multivibrator output of frequency $f_0$, from the filter 43 to the transmitter 42, through the communication input network 45, includes a connection 78, which extends from the upper output terminal of filter 43, to the back contacts of switches 73 and 77; and also a connection 79 which extends from the switch arm of switch 73 to the upper terminal of the communication input network 45. It will be observed from this switching arrangement that the output of filter 43 remains directly connected to the communication input network 45, over connections 78 and 79, so long as at least one of the switches 73 and 77, is non-actuated by its associated cam segment, and so that the switching arrangement 73, 77, will continue to supply the $f_0$ frequency output of the multivibrator 32 to the transmitter 42, except for that part of a revolution of the motor shaft S—2, during which the high speed cam 75 operates the high speed switch arm 76, while at the same time the low speed cam 70, operates the low speed switch arm 72. During the intervals that the switch arms 72 and 76 are concurrently actuated against their back contacts, by the cam segments 71 and 75, respectively, the output of multivibrator 32 can be completely cut off from the transmitter 42, or it can be greatly reduced or attenuated, as for example by bridging the connections 78, 79 with an attenuating network, as at 80. This concurrent actuation of the switch arms 72 and 76 against their back contacts respectively, can be applied to the transmitter 42, as merely an interruption of the frequency $f_0$, or, during this interval, a frequency $f_1$ or $f_2$ may be applied to the transmitter, or, alternatively, a combination of frequencies $f_1$ and $f_2$ may be so applied. The mechanism for effecting any of these various alternatives, comprises a manually actuated switch 81, etc., arm 82 of which may be adjusted to any of the fixed contacts 83, the first of which is grounded as shown, the second having connected thereto a source of frequency $f_1$, the third a frequency $f_2$ and the fourth having connected thereto the frequencies $f_1$ and $f_2$ in series. The switch arm 82 is in turn connected to the back contact of switch 77, so that when switches 77 and 73 are concurrently actuated against their back contacts, the switch arm 82 will be connected through the back contact and switch arm 76, of switch 77, and thence through the back contact and switch arm 72 of switch 73, to conductor 79, the latter extending to the communication input network 45, as above described. Thus, during the intervals that switch arms 72 and 76 are concurrently actuated against their back contacts, there will be applied to the transmitter 42, either merely an interruption or an attenuation of the multivibrator output, if the rotary switch arm 82 is on its grounded connection, or alternatively the frequency $f_1$, $f_2$, or the sum of the frequencies $f_1$ plus $f_2$, if this switch arm is on the $f_1$ or $f_2$ contact or on the $f_1$ plus $f_2$ contacts. The resulting transmission from the transmitter at 42 at the remote station, to the receiver 53 at the control station, of either the aforesaid inerruption or "notch" of frequency $f_0$, or alternatively either of the special frequencies $f_1$, $f_2$, or that of $f_1$ plus $f_2$, marks the indexing point on the remote radar scanner 35, carried by shaft R—2. For the values assumed above, one revolution of the fast drive shaft S—2, at the remote station, corresponds to about 16,000 microseconds, and to about 6° of arc on the slow drive shaft R—2, geared thereto. Assuming a 15° of arc closing time on the high speed switch 77, by the cam segment 75, this corresponds to 650 microseconds or about ¼° of arc of rotation of the scanner shaft R—2. As this corresponds to approximately 2½ cycles on a 4 kilocycle tone $f_1$, or 6½ kilocycles on a 10 kilocycle tone, it is seen that proper keying of such tones can be obtained in this manner.

At the control station, a filter and detector 84 is provided, having its input connected to the output of the control station receiver 53, over connections 85, and having its output connected over connections 86 connected to a phasing circuit 87 provided with a cathode ray tube viewing scope $87a$. The filter and detector circuit 84 is tuned to the master frequency $f_0$ if "notching" of the master frequency is employed for indexing, or alternatively is tuned to the frequency $f_1$ or $f_2$, if these frequencies are employed for indexing. If two simultaneous marking frequencies are employed, such as $f_1$ plus $f_2$, or if marking frequencies combined with "notching" (partial or complete) of the distant master frequency is used, then a filter system is installed at 84 for each of these frequencies, and their outputs are combined through an interlocking circuit, which will generate an output only when the desired combination of frequencies or notching, is received. At the remote station, the additional intelligence channels 46, may be interrupted for the duration of the indexing pulse. However, the switching arrangements required for this are not shown for purposes of simplicity.

At the control station, and "early gate" and a "late gate" are generated, by a combination of segments, as shown generally at 88, 89 and 90. The resulting early and late gate pulses are applied to the phasing network 87 over connections 91 and 92 respectively, along with the indexing pulse received from the remote station, the latter, as above stated, being applied to the phasing network 87 over connections 86.

The construction and operation of the early and late gate mechanisms, is as follows. The early and late gate pulses are derived respectively from a pair of cylindrical contacts, 88 and 89, mounted on the fast motor shaft S—1 at the control station. Each of these contacts is composed of an insulating material having at one end thereof a metal slip ring as at 93, 94, on which rides a switch arm, as at 95, 96. Also, each cylinder is provided at its opposite end with a metal cam segment as at 97, 98, connected to the corresponding slip rings through an insulated connection as at 99, 100. Riding on the end of each contact cylinder, which carries the conductive segment, is a second switch arm as at 101, 102. Switch arms 95 and 102 are connected to the phasing circuit 87 over connections 91 and 92 respectively; while switch arms 96 and 101 are respectively connected over conductors 103, 104, to back contacts of a switch 105 having associated therewith respectively contacts of a multiple switch arm 106, the latter being actuated by a cam segment 107 of the cam wheel 90, which latter is mounted on the slow shaft R—1.

It will be observed that the cam segments 97, 98 on cylinders 88, 89 respectively have an angular spacing which is less than that covered by the angle of cam 75 at the remote station. The cam segment 107 on the slow cam wheel 90 is of such width as to maintain the switch 105 operated for a sufficient interval during each revolution of shaft 16, as to permit cam segment 97 to contact switch arm 101, and also to permit cam segment 98 to contact switch arm 102, thus to transmit to the phasing network 87 the early and late gate pulses above referred to. These closing angles correspond to less than one revolution of the fast shaft.

Accordingly if the notching impulse from the remote station is applied over conductors 86 to the phasing network 87, at any instant other than that which is applied midway in point of time, between the arrival at the phasing network of the early and late gate pulses respectively, the phasing network will energize a phasing motor 108 over connections 109 to operate the motor in one direction or in the opposite direction, as the case may be. This phasing motor in turn drives through its shaft 110, a differential 111, which latter in turn drives the differential 15 interposed in shaft S—1, thereby to adjust and maintain the shaft R—1 at the control station in the same phase relationship or in phase synchronism with the shaft R—2, at the remote station. In addition, the differential 111 is provided with a hand wheel 112 mounted on one of the differential gear shafts 113 to provide for manual adjustment of the phasing relationship above referred to.

At the control station, the triggering pulses and the video signals from radar 37 are applied over connections 114 to a radio transmitter 115 for transmission to a corresponding radio receiver 116 at the control station, from which they are transmitted to the radar indicator 18, thereat over connections 117. Thus, the area reached by the scanner 35 at the remote station appears on the radar indicator scope 18 at the control station.

Figure 2:
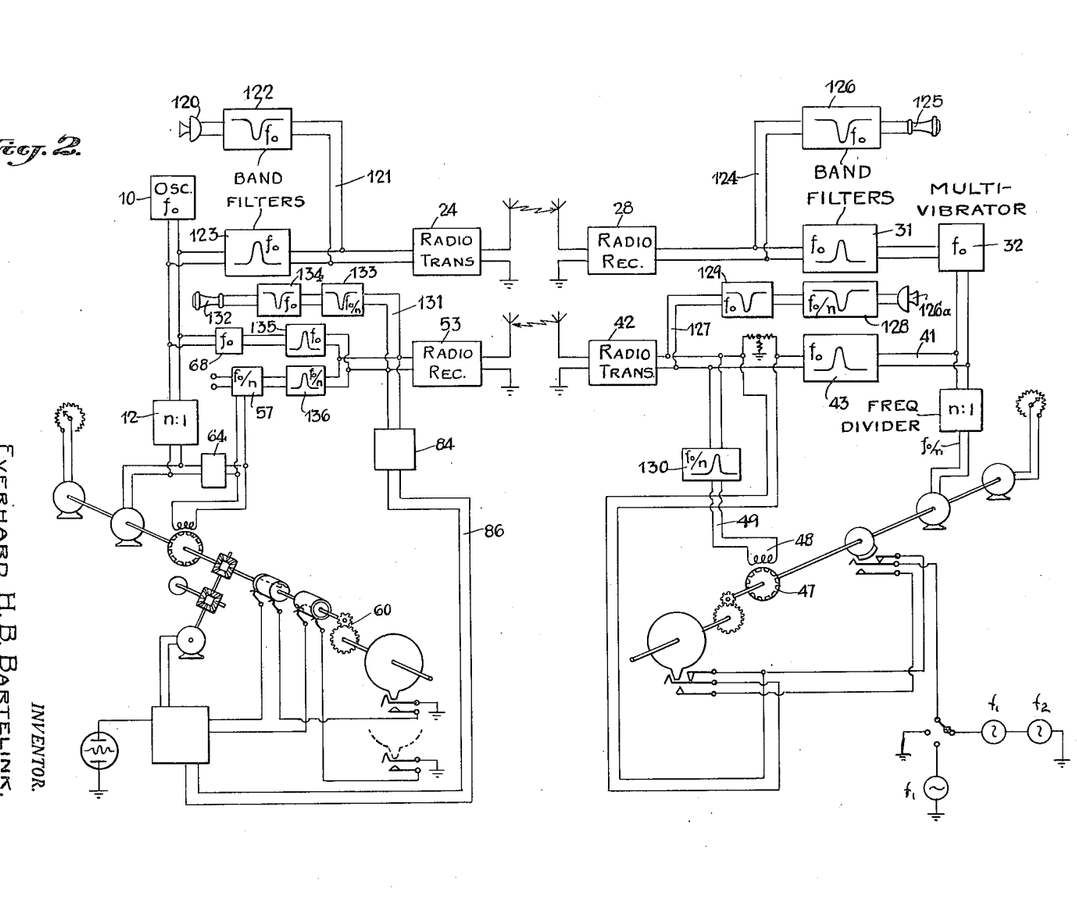
Figure 5:
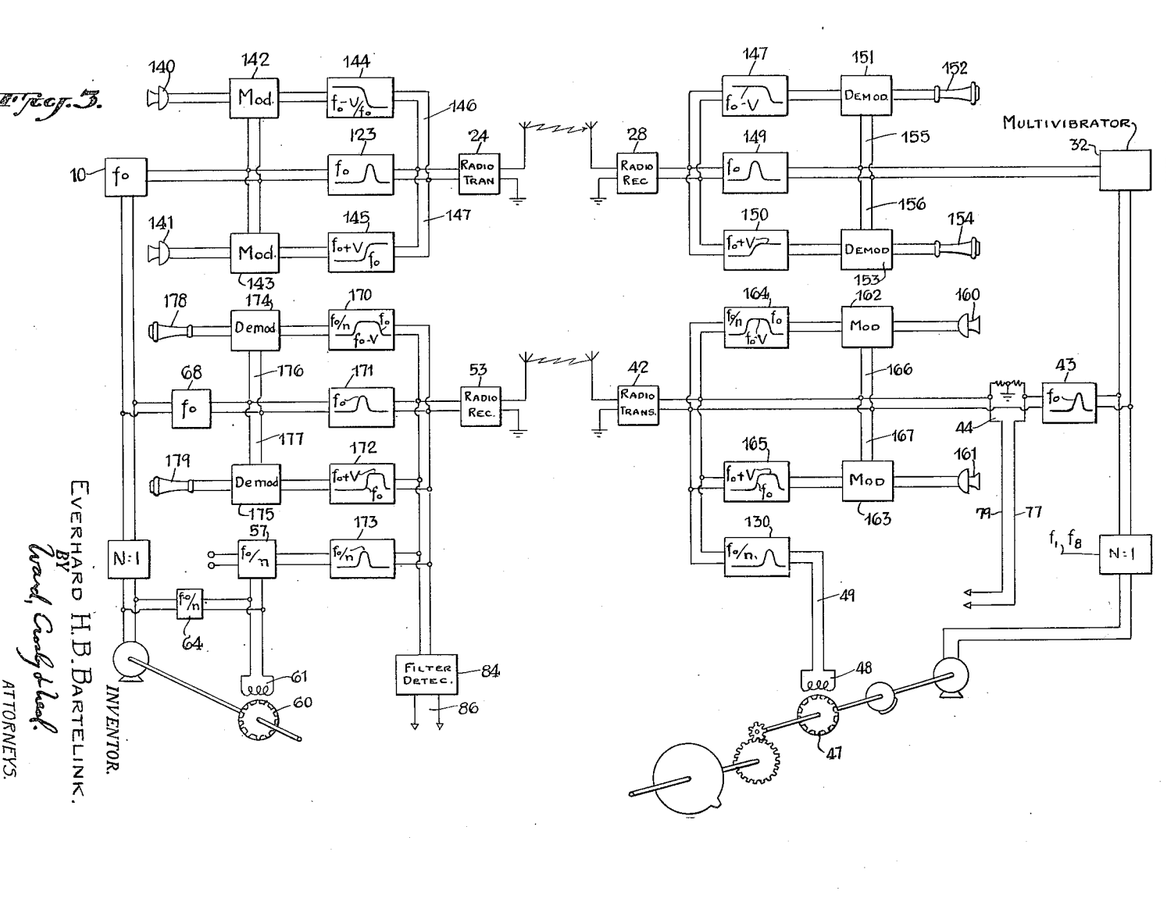

Refer now to Figure 2 which illustrates one arrangement for superimposing intelligence channels on the synchronizing system of Figure 1. At the control station in Figure 2, a telephone transmitter 120 is connected over leads 121 to the input of radio transmitter 24, through a filter circuit 122, sharply tuned, as graphically illustrated, to eliminate the master frequency $f_0$. The master oscillator 10 is in turn connected to the input of radio transmitter 24 through a filter circuit 123, which is sharply tuned, as indicated, to pass the master frequency $f_0$. Thus, speech input to the telephone transmitter 120, and the master frequency $f_0$, are applied, over separate channels to the input of radio transmitter 24, to modulate the outgoing carrier therewith.

At the remote station, the so modulated carrier is demodulated in radio receiver, and is then separated into channels by means of isolating filter circuits. The speech output from receiver 28 is fed over connections 124 to a telephone receiver 125 through a filter circuit 126, sharply tuned to eliminate the master frequency $f_0$; while the latter frequency is fed, as previously described, to the multivibrator 32 through tuned circuit 31, tuned to pass the frequency $f_0$.

Thus, an observer at the control station may talk to an observer at the remote station. In order to correspondingly permit the remote station observer to talk to the observer at the control station, a telephone transmitter 126a at the remote station is connected over leads 127 to the input of radio transmitter 42 thereat, through a filter circuit 128, tuned to suppress the frequency $f_0/n$, and thence through a filter 129 tuned to suppress the frequency $f_0$. The $f_0$ frequency output of multivibrator 32 is fed, as before, over connections 41 to the radio transmitter output through filter 43 tuned to pass this frequency. Also, the frequency $f_0/n$ generated in the toothed wheel pickup coil 48 is applied over connections 49 to the radio transmitter input, through a filter 130 tuned to pass this frequency. Thus, the speech frequencies, and the frequencies $f_0$ and $f_0/n$ are applied over separate channels, isolated by filters, to the input of radio transmitter 42, to modulate the outgoing carrier therewith.

The so modulated carrier incoming to radio receiver 53 at the control station, is demodulated therein, the demodulated output being then separated into appropriate channels, isolated by filters, and passed on to their appropriate mechanism. The speech output is fed over connections 131 to a telephone receiver 132 through filters 133 and 134 in series, tuned respectively to suppress the frequencies $f_0/n$ and $f_0$. The $f_0$ frequency output from the radio receiver is fed through filter 135, tuned to pass this frequency, to the alarm and test circuit 68. Similarly, the $f_0/n$ frequency output, is fed through a filter 136, tuned to pass this frequency, to the alarm and test circuit 57.

Additional speech or intelligence may be transmitted in the frequency band between $f_0$ and the cutoff of the system. The filters 122, 126, 129 and 134 are then replaced by low pass filters which eliminate the frequency $f_0$. The other channels are then inserted in similar manner but thru by-pass filters which also eliminate $f_0$.

Refer now to Figure 3, which shows a further arrangement for superimposing intelligence channels on the synchronizing channels. The master frequency $f_0$ from oscillator 10, is applied to the input of radio transmitter 24 through filter 123, tuned to pass the frequency. Also, a pair of telephone transmitters 140, 141, are connected respectively through modulators 142, 143, and thence through filters 144, 145, to the input of radio transmitter 24, over connections 146, 147. Modulators 142, 143 are supplied with carrier current of frequency $f_0$ from oscillator 10 over connections 148, 149 respectively. Filter 144 is a low pass filter adapted to transmit the lower side band $f_0-v$ in the output of modulator 144. Filter 145 is a high pass filter adapted to transmit the upper side band $f_0+v$ in the output of modulator 145. The transmitting system thus comprises the voice channels 140, 142, 144 and 141, 143, 145 operating in the upper and lower side bands respectively of the carrier frequency $f_0$, and also the synchronizing channel 10, 123 operating on frequency $f_0$. The outputs from these various channels are impressed in parallel on the input to radio transmitter 24 to modulate the outgoing radio carrier therewith.

At the remote station, the so modulated incoming radio carrier is demodulated to provide in its output the master frequency $f_0$, as well as the upper and lower voice modulated side bands thereof, which components are separated into corresponding receiving system channels by means of isolating filters 148, 149, 150, having their inputs connected in parallel to the radio receiver output. Filter 148 is low pass adapted to transmit only the lower $f_0-v$ to a demodulator 151, having its output connected to a telephone receiver 152. Filter 149 is sharply tuned to transmit only the master $f_0$ to the input of multivibrator 32. Filter 150 is high pass adapted to transmit only the upper side band to a demodulator 153 having a telephone receiver 154 connected to its output. Demodulators 151, 153 are supplied with the incoming carrier frequency $f_0$ over connectors 155, 156 respectively. Thus, an observer at 140 may talk to an observer at 152 over one voice channel; while at the same time, an observer at 141 may talk to an observer at 154 over the other voice channel. Other than voice intelligence may be transmitted over these channels.

For talking over these channels in the opposite direction over the two voice channels, the remote station is provided with a pair of telephone transmitters 160, 161, respectively connected through modulators 162, 163, and filters 164, 165, to the input of radio transmitter 42. The $f_0$ frequency output of multivibrator 32 is, as before, applied to the radio transmitter input over connections 41 and through filter 43, sharply tuned to pass the frequency. The modulators 162, 163 are supplied with carrier current of frequency $f_0$ from the multivibrator output over connections 166, 167, bridging conductors 41. The synchronizing frequency $f_0/n$ derived from the toothed wheel coil 48 is applied over conductors 49 and through filter 130, tuned to pass the frequency, to the input of the radio transmitter. Filter 164 in the output of modulator 162 is a band pass filter for passing the lower side band $f_0-v$ but with cutoffs above the frequency $f_0/n$ and below $f_0$. Filter 165 in the output of modulator 164 is a band pass filter for passing the upper side band $f_0+v$ with a cutoff above $f_0$.

The radio carrier outgoing from radio receiver 42 at the remote station is thus modulated with the upper and lower side bands of the $f_0$ carrier, i. e., $f_0-v$ and $f_0+v$, as well as by the synchronizing frequencies $f_0$ and $f_0/n$ and also by the indexing frequencies $f_1$ or $f_1 + f_2$ employed. At the control station, the so modulated radio carrier incoming to radio receiver is demodulated to produce the above noted demodulation components, which are thereupon separated into their appropriate channels by means of isolating filters 170—173 and the filter detector 84, the inputs to which are connected in parallel across the receiver output. Filters 170, 172 are band pass filters similar to 164, 165 respectively for separating out the lower and upper side bands $f_0-v$ and $f_0+v$, which are thereupon applied to demodulators 174, 175, connected in these filter outputs respectively. Filter 171 transmits the frequency $f_0$ to the alarm and test circuit 68, as above described, and also supplies carrier to the demodulators over connectors 176, 177. Filter 173 separates the frequency $f_0/n$ and applies it to the alarm and test circuit 57, as aforesaid. The filter-detector 84 separates the indexing frequencies $f_1$ or $f_1 + f_2$ if employed and transmits the output over connections 86 to the phasing network 87, Fig. 1, as aforesaid. The voice frequency output of demodulators 174, 175, is applied to telephone receivers 178, 179 over the connections shown. Again, other intelligence than speech may be transmitted.

What is claimed as new is:

1. A remote synchronizing system comprising: a control station and a remote station; a master oscillator at the control station for generating a control frequency; a remote oscillator at the remote station, normally oscillating slightly off said control frequency; means for transmitting said control frequency to said remote oscillator, for synchronizing the same with said master oscillator; means for retransmitting to said control station an output component of said remote oscillator; means at the control station for comparing the control frequency with said remote oscillator output component; a motor at each station driven by the oscillator thereat; a frequency generator at each station driven by the motor thereat; a device at the control station for comparing the frequency outputs of said control and remote station generators; and means for transmitting to said device, an output component of each said generator.

2. A remote synchronizing system comprising: a control station and a remote station; a master oscillator at the control station for generating a control frequency; a remote oscillator at the remote station, normally oscillating slightly off said control frequency; means for transmitting said control frequency to said remote oscillator and for synchronizing the same with said master oscillator; means for retransmitting to said control station an output component of said remote oscillator; means at the control station for comparing said control frequency with said remote oscillator output component; a frequency divider at each said station connected to the output of the oscillator thereat, for converting the output frequency thereof to a lower frequency; a motor at each station driven by the frequency divider thereat; a frequency generator at each station driven by the motor thereat, for generating a frequency corresponding to said lower frequency; a device at the control station for comparing the frequency outputs of said control and remote station generators; and means for transmitting to said device an output component of each said generator.

3. A remote synchronizing system comprising: a control station and a remote station; a master oscillator at the control station for generating a control frequency; a remote oscillator at the remote station, normally oscillating slightly off said control frequency; means for transmitting said control frequency to said remote oscillator and for synchronizing the same with said master oscillator; a motor at each station driven by the oscillator thereat; a fast shaft at each station driven by the motor thereat, together with a slow shaft driven by the fast shaft through reduction gearing; a cam actuated switch on the fast shaft, and a cam actuated switch on the slow shaft at each said station; means responsive to concurrent actuation of said fast shaft and said slow shaft cam switches at the remote station for transmitting an indexing impulse to a phasing device at the control station; means responsive to concurrent actuation of the fast shaft and slow shaft cam switches at the control station for transmitting early and late gate impulses to said phasing device; and means responsive to said phasing device for automatically adjusting said control station fast and slow shafts into phase synchronism with said remote station fast and slow shafts, said means comprising a phasing motor driven by said phasing device, together with a differential gear interposed in said control station fast shaft, and having a phase adjusting gear driven by said phasing motor.

4. A remote synchronizing system comprising: a control station and a remote station; a master oscillator at the control station for generating a control frequency; a remote oscillator at the remote station, normally oscillating slightly off said control frequency; means for transmitting said control frequency to said remote oscillator and for synchronizing the same with said master oscillator; a motor at each station driven by the oscillator thereat; a fast shaft at each station driven by the motor thereat, together with a slow shaft driven by the fast shaft through reduction gearing; a cam actuated switch on the fast shaft, and a cam actuated switch on the slow shaft at the remote station; means responsive to concurrent actuation of said cam switches for transmitting an indexing impulse to a phasing device at the control station; a pair of cam switches on the fast shaft at the control station together with a cam switch on the slow shaft thereat; means responsive to concurrent actuation of said slow shaft cam switch and one of said fast shaft cam switches, for transmitting to said phasing device an early gate impulse, and means responsive to concurrent actuation of said slow shaft cam switch and the other of said fast shaft cam switches for transmitting to said phasing device, a late gate impulse; and means including said phasing device, and responsive to said early gate, late gate and indexing impulses, for automatically adjusting and maintaining said control station fast and slow shafts in phase synchronism with said remote station fast and slow shafts respectively, said means including in addition to said phasing device, a phasing motor driven thereby, together with a differential gear interposed in said control station fast shaft, and having a phase adjusting gear driven by said phasing motor.

5. A remote synchronizing system comprising: a control station and a remote station; a master oscillator at the control station for generating a control frequency; a remote oscillator at the remote station, normally oscillating slightly off said control frequency; means for transmitting said control frequency to said remote oscillator, for synchronizing the same with said master oscillator; means for retransmitting to said control station an output component of said remote oscillator; means at the control station for comparing the control frequency with said remote oscillator output component; a motor at each station driven by the oscillator thereat; a frequency generator at each station driven by the motor thereat; a device at the control station for comparing the frequency outputs of said control and remote station generators; means for transmitting to said device, an output component of each said generator; a fast shaft at each station driven by the motor thereat, together with a slow shaft driven by the fast shaft through reduction gearing; a cam actuated switch on the fast shaft, and a cam actuated switch on the slow shaft at the remote station; means responsive to concurrent actuation of said cam switches for transmitting an indexing impulse to a phasing device at the control station; a pair of cam switches on the fast shaft at the control station together with a cam switch on the slow shaft thereat; means responsive to concurrent actuation of said slow shaft cam switch and one of said fast shaft cam switches, for transmitting to said phasing device an early gate impulse, and means responsive to concurrent actuation of said slow shaft cam switch and the other of said fast shaft cam switches for transmitting to said phasing device, a late gate impulse; and means including said phasing device, and responsive to said early gate, late gate and indexing impulses, for automatically adjusting and maintaining said control station fast and slow shafts in phase synchronism with said remote station fast and slow shafts respectively, said means including in addition to said phasing device, a phasing motor driven thereby, together with a differential gear interposed in said control station fast shaft, and having a phase adjusting gear driven by said phasing motor.

6. A remote synchronizing system comprising: a control station and a remote station, each including a carrier current transmitter and receiver; a master oscillator at the control station for generating a control frequency; a remote oscillator at the remote station, normally oscillating slightly off said control frequency; means including said control station transmitter and said remote station receiver, for transmitting said control frequency to said remote oscillator, for synchronizing the same with said master oscillator; means including said remote station transmitter and said control station receiver, for retransmitting to said control station an output component of said remote oscillator; means at the control station for comparing the control frequency with said remote oscillator output component transmitted thereto; a motor at each station driven by the oscillator thereat; a frequency generator at each station driven by the motor thereat; a device at the control station for comparing the frequency outputs of said control and remote station generators; and means including said remote station transmitter and said control station receiver, for transmitting to said device, an output component of each said generator.

7. A remote synchronizing system comprising: a control station and a remote station, each including a carrier current transmitter and receiver; a master oscillator at the control station for generating a control frequency; a remote oscillator at the remote station, normally oscillating slightly off said control frequency; means including said control station transmitter and said remote station receiver, for transmitting said control frequency to said remote oscillator, for synchronizing the same with said master oscillator; means including said remote station transmitter and said control station receiver, for retransmitting to said control station an output component of said remote oscillator; means at the control station for comparing the control frequency with said remote oscillator output component transmitted thereto; a motor at each station driven by the oscillator thereat; a frequency generator at each station driven by the motor thereat; a device at the control station for comparing the frequency outputs of said control and remote station generators; and means including said remote station transmitter and said control station receiver, for transmitting to said device, an output component of each said generator; a fast shaft at each station driven by the motor thereat, together with a slow shaft driven thereby through reduction gearing; cam switches on the fast and slow shafts respectively at the remote station; means responsive to concurrent actuation of said cam switches for transmitting an indexing impulse to a phasing device at the control station, said means including said remote station transmitter and said control station receiver; a pair of cam switches on the fast shaft at the control station and a cam switch on the slow shaft thereat; means responsive to concurrent actuation of said slow shaft cam switch and one of said fast shaft cam switches, for transmitting to said phasing device an early gate impulse, and means responsive to concurrent actuation of said slow shaft cam switch and the other of said fast shaft cam switches for transmitting to said phasing device, a late gate impulse; and means including said phasing device, and responsive to said early gate, late gate and indexing impulses, for automatically adjusting and maintaining said control station fast and slow shafts in phase synchronism with said remote station fast and slow shafts respectively, said means including in addition to said phasing device, the phasing motor driven thereby, together with a differential gear interposed in said control station fast shaft, and having a phase adjusting gear driven by said phasing motor.

8. A remote synchronizing system comprising: a control station and a remote station, each including a carrier current transmitter and receiver; a master oscillator at the control station for generating a control frequency; a remote oscillator at the remote station, normally oscillating slightly off said control frequency; means including said control station transmitter and said remote station receiver, for transmitting said control frequency to said remote oscillator, for synchronizing the same with said master oscillator; means including said remote station transmitter and said control station receiver, for retransmitting to said control station an output component of said remote oscillator; a first device at the control station for comparing the control frequency with the remote oscillator output component transmitted to the control station; a motor at each station driven by the oscillator thereat; a frequency generator at each station driven by the motor thereat; a second device at the control station for comparing the frequency outputs of said control and remote station generators; means including said remote station transmitter and said control station receiver, for transmitting to said second device, an output component of each said generator; a telephone transmitter and receiver at the control station; means including isolating filters connecting said telephone transmitter and said master oscillator to the input of said carrier wave transmitter, and connecting said telephone receiver and said first and second comparing devices respectively, to the output of said carrier wave receiver; a telephone transmitter and receiver at the remote station; and means including isolating filters connecting the output of the radio receiver thereat to said telephone receiver and to the input of the oscillator thereat respectively, and connecting the telephone transmitter, the oscillator output and the frequency generator output to the input of the radio transmitter thereat respectively.

9. A remote synchronizing system comprising: a control station and a remote station, each including a carrier current transmitter and receiver; a master oscillator at the control station generating a control frequency; a remote oscillator at the remote station, normally oscillating slightly off said control frequency; means including said control station transmitter and said remote station receiver for transmitting said control frequency to said remote oscillator, for synchronizing the same with said master oscillator; means including said remote station transmitter and said control station receiver, for retransmitting to said control station an output component of said remote oscillator; a first testing device at the control station for comparing the control frequency with said remote oscillator component transmitted to the control station; a motor at each station driven by the oscillator thereat; a frequency generator at each station driven by the motor thereat; a second testing device at the control station for comparing the frequency outputs of said control and remote station generators; means including said remote station transmitter and said control station receiver, for transmitting to said second device, an output component of each said generator; a fast shaft at each station driven by the motor thereat, together with a slow shaft driven thereby through reduction gearing; cam switches on said fast and slow shafts respectively at the remote station; means responsive to concurrent actuation of said cam switches for transmitting an indexing impulse to a phasing device at the control station, said means including the remote station transmitter and the control station receiver; cam switching means on the fast and slow shafts at the control station, together with means responsive to concurrent actuation of the cam switching means on said shafts for transmitting to said phasing device an early gate impulse and a late gate impulse, for each revolution of the slow shaft; means responsive to said early gate, late gate and indexing impulses, for automatically adjusting and maintaining said control station fast and slow shaft in phase synchronism with said remote station fast and slow shafts respectively, said means including said phasing devices, and a phasing motor driven thereby, together with a differential gear interposed in said control station fast shaft, and having a phase adjusting gear driven by said phasing motor; a telephone transmitter and receiver at the control station, means including isolating filters connecting said telephone transmitter and said master oscillator to the input of said carrier wave receiver, and connecting the output of said radio transmitter thereat, and connecting the input of the carrier wave transmitter thereat, and connecting the output of the carrier wave receiver thereat to said telephone receiver, to said first and second testing devices and to said phasing devices respectively; a telephone transmitter and receiver at the remote station; and means, including isolating filters, connecting the output of the carrier wave receiver thereat to said telephone receiver and to the input of said remote oscillator, and connecting said telephone transmitter, and the input of said remote oscillator, and also the output of the frequency generator thereat; connecting the telephone transmitter output, the remote oscillator output, the frequency generator output, and the output of the indexing cam switches, to the input of the carrier wave transmitter thereat.

EVERHARD H. B. BARTELINK.

REFERENCES CITED

The following references are of record in the file of this patent:

UNITED STATES PATENTS

| Number | Name | Date |
|---|---|---|
| 1,928,794 | Poole | Oct. 3, 1933 |
| 2,218,636 | Bruckner | Oct. 22, 1940 |
| 2,256,487 | Moseley et al. | Sept. 23, 1941 |
| 2,326,290 | Dickieson | Aug. 10, 1943 |
| 2,444,750 | Ptacek | July 6, 1948 |